United States Patent

[11] 3,579,212

[72] Inventor Andrew Gabor
Bedford, Mass.
[21] Appl. No. 710,506
[22] Filed Mar. 5, 1968
[45] Patented May 18, 1971
[73] Assignee Honeywell, Inc.
Minneapolis, Minn.

[54] A REPRODUCING HEAD IN A LIQUID MEDIUM

6 Claims, 2 Drawing Figs.

[52] U.S. Cl. .......... 340/174.1E
179/100.21
[51] Int. Cl. .......... G11b 5/60
[50] Field of Search .......... 340/174.1
(E), (F); 179/100.2 (C), (P)

[56] References Cited

UNITED STATES PATENTS

| | | | |
|---|---|---|---|
| 3,005,675 | 10/1961 | Ledin et al. .......... | 340/174.1 |
| 3,170,045 | 2/1965 | Baumeister et al. .......... | 340/174.1 |
| 3,273,896 | 10/1966 | Maeder .......... | 179/100.2 |
| 2,928,709 | 3/1960 | Baumeister .......... | 340/174.1 |
| 3,179,945 | 5/1965 | Shapiro .......... | 340/174.1 |
| 3,319,236 | 5/1967 | Hajen .......... | 340/174.1 |

*Primary Examiner*—Bernard Konick
*Assistant Examiner*—Vincent P. Canney
*Attorney*—Fred Jacob

ABSTRACT: High density storage magnetic recording systems are described in which the reproducing transducers must be positioned in accurately maintained close proximity to the surface of the recording medium. Both transducers and recording medium are immersed in a liquid so that relative motion between the recording surface and the transducers develops a liquid film of controlled thickness for maintaining uniform close spacing.

Figure 1:
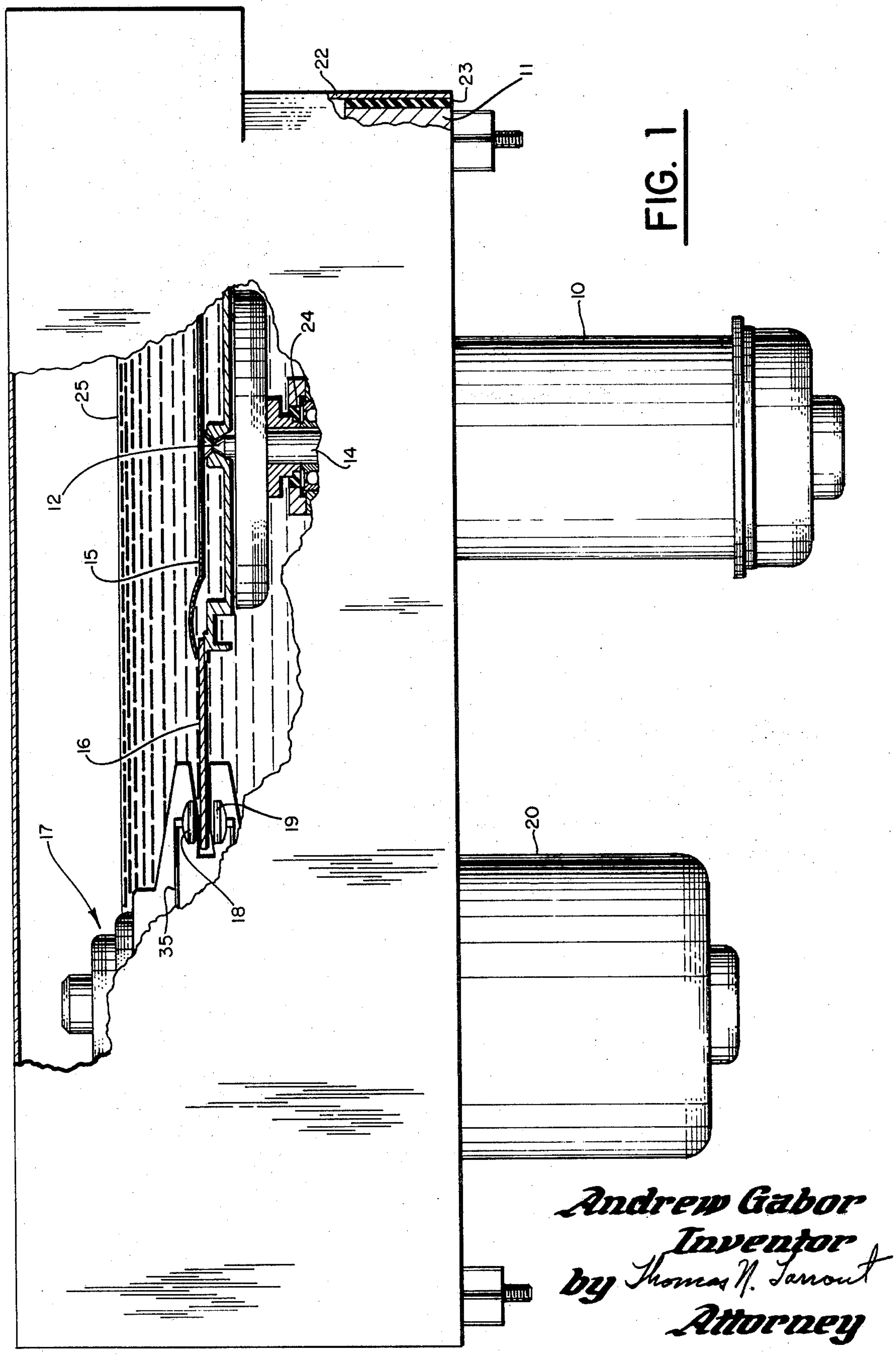

Andrew Gabor
Inventor
by Thomas N. Sarrout
Attorney

Andrew Gabor
Inventor
by Thomas N. Tarrant
Attorney

A REPRODUCING HEAD IN A LIQUID MEDIUM

BACKGROUND OF THE INVENTION

With the ever-increasing storage capacity demanded by data processing, considerable research effort is being expended on increasing storage density in the common storage media. In magnetic tape, drum and disc systems, higher density means higher resolution requirements both in record and playback modes. Higher resolution means the reproducing transducers must be made with greatly increased precision. Smaller pole gaps are used and an operative surface of the transducers must be brought extremely close to the recording surface.

Even with extremely small pole gaps, the speed of data transmission requires high relative velocities between the transducers and the recording surface to obtain the necessary frequency response. At these speeds and with the small pole gaps, both transducers and magnetic record surface would quickly deteriorate if the transducers were allowed to bear directly against the recording surface. A critical problem is the possible distortion or loss of information by such contact.

To achieve close uniform spacing, it is known to use a fluid bearing. Commonly, this fluid bearing employs a gas, usually air. With a suitably shaped transducer, enough air pressure can be developed by the relative velocity of the reproducing surface with respect to the transducer to provide flotation. In other cases air under externally generated pressure is provided through jets to produce the fluid film. A problem with gaseous bearings arises from the compressibility of the gas. This compressibility permits irregularities in the recording surface to break through the gaseous film permitting deleterious contact. In an attempt to overcome this difficulty, it is known to substitute a liquid for the bearing in magnetic recording. Although incompressible, a liquid is more difficult to handle. For example, in U.S. Pat. No. 3,060,431 to H. W. Fuller et al., the transducer flies over the liquid which is applied to the recording surface as a film of limited thickness. The film is thick enough only to cover the recording surface and to allow for a slight submersion of the transducer pole pieces. In practice, many problems are encountered in applying and maintaining such a liquid film of uniform thickness to a magnetic recording medium, as evidenced by the additional apparatus required and disclosed in the aforesaid Fuller patent.

The use of a liquid in a fluid bearing must, of course, be distinguished from its use as a lubricant for the purpose of minimizing wear. For example, in U.S. Pat. No. 3,319,236 to Hajen, various arrangements are disclosed in which oil is used to lubricate the surface of a cylindrical recording drum. As evidenced by Hajen's description, which requires the head to contact the drum, the oil acts as a lubricant even when the recording drum is completely immersed in it.

Similarly, U.S. Pat. Nos. 2,945,697 and 3,144,335, both to P. F. Maeder, describe magnetic tape recorders wherein the tape and transducers are immersed in a liquid and contact between them is specified. Here, the liquid is selected to approximate the specific gravity of the tape so as to reduce the effects of acceleration when used in airborne or space vehicles.

Representative of other uses of a liquid at or near the reproducing zone is U.S. Pat. No. 3,165,594 to W. A. Wootten, which describes a tape recorder wherein the tape is immersed in a liquid. It is also known to immerse a magnetic head and medium in a cleaning solution. However, in all these cases the head and the medium are either in contact with each other, or they are spaced apart in fixed relationship so as to preclude the formation of a fluid bearing between the head and the medium. The above-mentioned patents are representative of the state of the art in magnetic recording devices wherein a liquid is used at or near the reproducing zone. From a consideration of these patents, it is clear that, insofar as they are directed to a liquid bearing for such devices, they fall short of providing apparatus that is simple, trouble-free and which may be economically constructed.

OBJECTS OF THE INVENTION

It is an object of the invention to provide a magnetic reproducing system in which the reproducing heads fly on a film of incompressible fluid out of contact with the record medium. It is a further object of the invention to provide a novel magnetic disc reproducing system in which both disc and reproducing heads are immersed in a liquid such that during relative motion the heads fly adjacent to the disc surfaces. Further objects and features of the invention will become apparent upon reading the following description together with the drawings.

DESCRIPTION OF THE INVENTION

Figure 2:
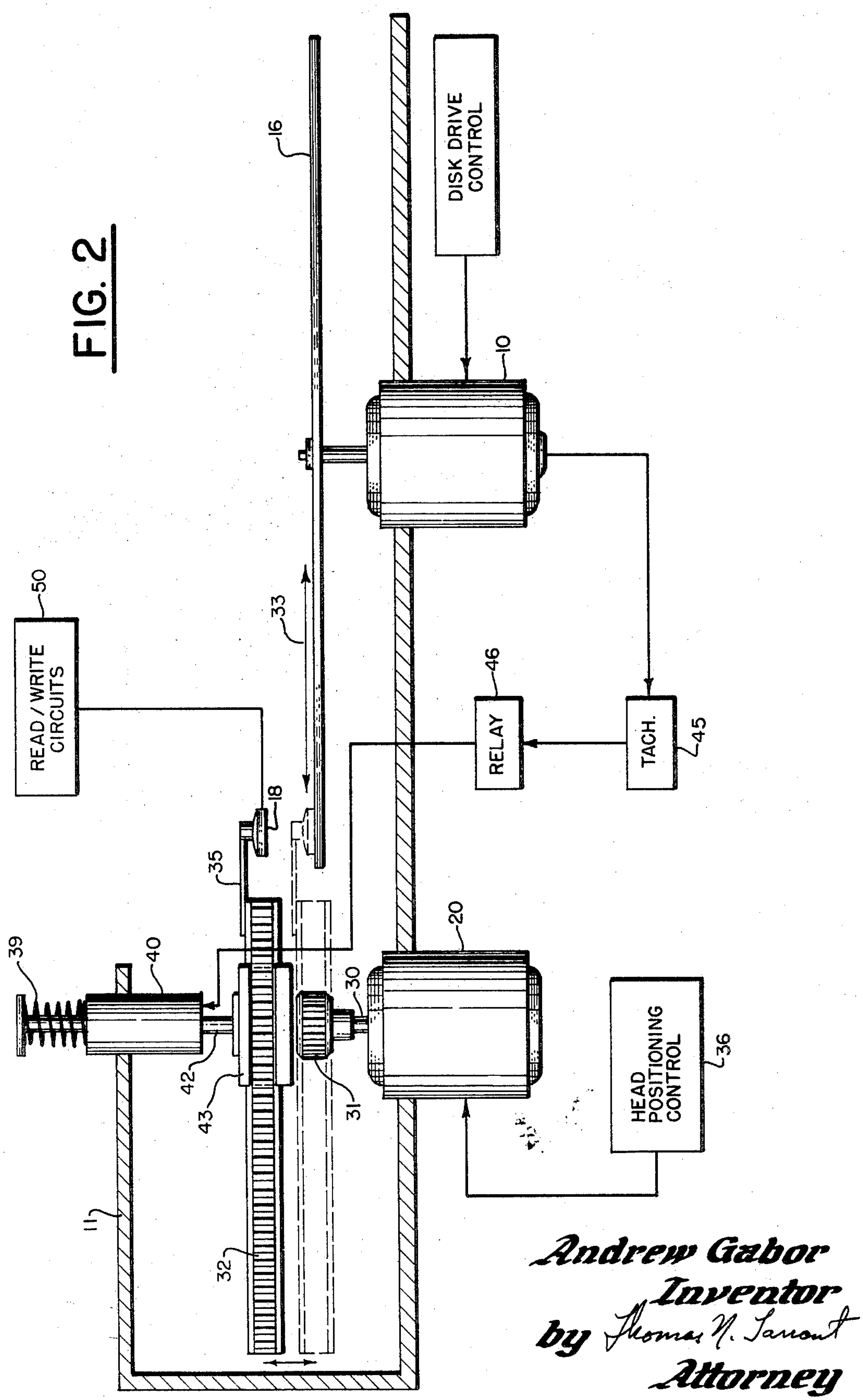

In the drawings:

FIG. 1 is a front elevation of a disc reproducing apparatus in partial cross section, FIG. 2 is a block diagram of a disc reproducing system.

The reproducing heads and the recording medium of a magnetic reproducing system are, in accordance with the invention, immersed in a liquid medium. This is depicted in FIG. 1 in an embodiment of a single disc magnetic reproducing unit. Disc drive motor 10 is secured to frame 11. Spindle 12, fastened to shaft 14 of motor 10, carries disc supporting structure 15 which in turn supports magnetic reproducing disc 16 for rotation.

Positioning device 17 supports and positions reproducing heads 18 and 19 on opposite faces of disc 16 for radial movement with respect to the disc. Positioning movement, is provided by position motor 20 operating a rack and pinion gear arrangement (see FIG. 2). Motor 20 is secured to frame 11 along with the stationary parts of device 17. Liquid retaining housing 22 which may be open at the top is secured to frame 11. Gasket 23 is provided around the perimeter of frame 11 to give a liquid seal. Shaft 14 of motor 10 is sealed by gland 24 and the shaft of motor 20 is similarly sealed (not shown). Frame 11 and housing 22 thus form a sealed container for liquid 25.

The liquid 25 used should be inert and homogeneous. It is preferably free from alkalies, acids and oxidation promoting constituents in order to prevent harmful side effects on the reproducing equipment. Other desirable characteristics of the liquid relate to safety and health.

A number of suitable petroleum products are available in a wide range or viscosities. Liquids that have been found satisfactory include silicone oil, carbon tetrachloride, O-xylene and many others. While viscosity of the liquid is important, it varies widely depending on other parameters of the specific embodiment. The area and shape of the surfaces involved, the relative velocities, any externally applied forces and the required spacing between the surface of the reproducing head and the reproducing surface all interact along with the viscosity of the liquid as parameters which determine the hydrodynamic conditions.

The interaction of all these parameters is determined by the equation:

$$\frac{d}{dx}\left(h^3\frac{dp}{dx}\right)+\frac{d}{dy}\left(h^3\frac{dp}{dy}\right)=6\mu V\frac{dh}{dx}$$

where $p$ is the pressure at a point $(x, y)$ in the liquid film between the two surfaces (the head and the reproducing surface), $x$ is the coordinate in the direction of motion, $y$ is the coordinate perpendicular to the motion in the plane of said film, $h$ is the coordinate perpendicular to said film $u$ is viscosity of said liquid and V is relative velocity between the two surfaces. This hydrodynamic equation is the form of the Navier-Stokes equation for the laminar flow of the liquid which results from the relative velocity between the completely immersed surfaces.

In determining a specific embodiment utilizing the above equation, a selected size and shape of head is chosen. In the preferred embodiment of the invention, as shown in FIGS. 1 and 2, the reproducing heads 18 and 19 are disc heads of the conventional type which have continuous, flat flying surfaces adjacent to the disc 16. The leading edge should be at a tilt or have an upward curve to it at least during operation as in the usual case of hydrodynamic lubrication. (For example, see U.S. Pat. No. 3,060,431 to H. W. Fuller et al.) The size will be determined by the size of the magnetic transducing elements. In digital data storage, this size will usually be as small as conveniently possible to minimize inertia. By comparison, aerodynamically supported heads require a support surface that is large relative to the actual transducing element because of the relatively low support force provided by gases.

The velocities involved are determined by the required frequency response and access time. The spacing between the head and the reproducing surface is determined by the resolution requirements. Since magnetic flux fields tend to spread, the spacing between the surfaces must be kept small to achieve good resolution particularly with high recording density. This spacing can be as small as approximately 10 microinches when using hydrodynamic support. In a given case, the minimum possible spacing without danger of contact will depend primarily on the surface characteristics of the record number. The presence of small abrupt surface irregularities requires greater spacing.

Having selected the above characteristics in accordance with the principles stated, a liquid is selected desirably with a viscosity that remains fixed over temperature ranges likely to be encountered. While the invention is applicable to liquids of different viscosities, the liquid should be selected with consideration for safety, health, lubricity, inertness, low cost, low volatility, low electrical conductivity and the like. Then using the above equation, the pressures (P) are derived and integrated over the support surface of the reproducing head. A balancing pressure is provided by means of, for example, a spring taking gravity into account where applicable.

When used in a disc reproducing system, some allowance must be made for relative velocity changes with changes in the radial positioning of the reproducing head. Thus, it may be desirable to provide additional clearance in the normal position of the head when the latter is positioned on the track nearest the disc center. With reproducing discs providing a large radial positioning range (relatively high number of tracks), it is preferable with a single head to operate the disc at different rotational speeds depending on head position. Other approaches are possible. With a plurality of heads a preferred embodiment provides different spring pressures for different radial positions. Each of the plurality of heads can also have different hydrodynamic configurations depending on radial position.

In FIG. 2 some of the implementation of a magnetic disc reproducing system is depicted in diagrammatic form. As in FIG. 1, disc 16 is rotated by motor 10 and reproducing head 18 is positioned relative to a surface of disc 16 by positioning motor 20.

Shaft 30 of positioning motor 20 carries pinion gear 31 engaging with geared rack 32. Rack 32 supports reproducing head 18 for selected movement to different radial positions relative to disc 16 as indicated by arrow 33. Leaf spring 35 interposed between head 18 and rack 32 determines the balancing pressure used to establish an equilibrium with the liquid pressure at the selected spacing. Position selection is determined through head positioning control 36 which governs the rotation of motor 20.

In nonoperating condition, a spring, for example helical spring 39, holds head 18 away from the surface of disc 16. Solenoid 40 mounted on a frame number 11, when actuated, moves rack 32 so as to place reproducing head 18 into the operative position adjacent to the surface of disc 16. When solenoid 40 is deactuated, spring 39 retracts solenoid plunger 42 moving rack 32 and thus head 18 away from disc 16. It will be understood that the magnetic portion of plunger 42 is at the same end as spring 39 so that actuation compresses spring 39. Rack 32 is engaged by bearings in coupler 43 on the end of plunger 42. These bearings (not shown) permit free back-and-forth motion of rack 32 under control of positioning motor 20.

Since contact between head 18 and disc 16 would result in damage, some form of interlock is desirable to maintain solenoid 40 deactuated until disc 16 is up to speed. One suitable arrangement is depicted in FIG. 2 using tachometer 45 and relay 46 to control solenoid 40. Tachometer 45 is connected to detect the rotation rate of motor 10. When tachometer 45 reaches a predetermined reading it actuates relay 46 which in turn provides power to solenoid 40.

While aerodynamically supported heads require a support surface that is large relative to the actual transducing element because of the relatively low support force provided by the air, the present invention permits the use of a relatively small head. As a consequence, inertia is minimized and more rapid and more accurate head positioning is possible. Moreover, by avoiding the problems inherent in the hydrodynamic flotation of a magnetic head on a liquid film, the present invention provides more reliable magnetic recording equipment that is also simpler and more economical to construct.

Although the invention has been described with respect to a specific embodiment of a disc reproducing machine, it is also applicable in suitable embodiments for use with drum and tape reproducing systems and the intent is to cover the invention broadly within the spirit and scope of the appended claims.

I claim:

1. A method of bearing the continuous, flying surface of a reproducing head adjacent to the surface of a recording medium comprising:
- completely immersing said medium and said head in a liquid,
- resiliently supporting said head,
- positioning said continuous flying surface of the head in proximity to said surface of the recording medium,
- providing relative motion between said head and said medium, urging said continuous, flying surface against said medium,
- selecting the velocity of said relative motion, said urging force, and the viscosity of said liquid such that the fluid pressure between the adjacent surfaces of said head and said medium maintains a uniform spacing therebetween.

2. A method of bearing a reproducing head according to claim 1 wherein said head and said medium comprises magnetic reproducing means.

3. A method of bearing a reproducing head according to claim 2 wherein said reproducing means is a magnetic disc reproducing system.

4. A reproducing system comprising:
- a reproducing head having a continuous, flying surface,
- a disc recording medium,
- a liquid filled container,
- means to support said head and said medium within said container immersed in said liquid, said means including means to resiliently urge said head against said medium,
- and means to provide relative motion between said head and said medium such that when said relative motion is provided, a liquid film is formed between the adjacent surfaces of said head and said medium conforming to the differential equation:

$$\frac{d}{dx}\left(h^3\frac{dp}{dx}\right)+\frac{d}{dy}\left(h^3\frac{dp}{dy}\right)=6\mu V\frac{dh}{dx}$$

where $x$ is the coordinate in the direction of motion, $y$ is the coordinate perpendicular to the motion in the plane of the liquid film, $h$ is the coordinate perpendicular to said film, $p$ is the fluid pressure between said adjacent surfaces, $\mu$ is fluid viscosity and V is relative velocity between said adjacent surfaces.

5. A reproducing system according to claim 4 in which said means to resiliently urge said head against said medium comprises means to hold said head out of contact with said medium in the absence of said relative motion.

6. A high density magnetic storage system comprising:
a. a magnetic storage disc having storage surface;
b. support means for supporting said disc for rotation;

c. magnetic transducer means, having a continuous, flying surface;

d. positioning means for resiliently supporting said transducer means, said positioning means connected to said support means for positioning said transducer in a selected position adjacent to said storage surface;

e. a housing surrounding both said disc and said transducer means;

f. a liquid contained by said housing completely surrounding said disc and said transducer means; and, g. means to rotate said disc whereby a pressurized film of said liquid develops between said transducer means and said surface conforming to the equation:

$$\frac{d}{dx}\left(h^3\frac{dp}{dx}\right)+\frac{d}{dy}\left(h^3\frac{dp}{dy}\right)=6\mu V\frac{dh}{dx}$$

where $p$ is the pressure in said film, $x$ is the coordinate in the direction of motion, $y$ is the coordinate perpendicular to the motion in the plane of said film, $h$ is the coordinate perpendicular to said film, $\mu$ is fluid viscosity of said liquid and V is relative velocity between said disc and said transducer.